May 21, 1929.  G. J. KEIPER  1,714,311
STEAMER
Filed Oct. 3, 1928   3 Sheets-Sheet 1

INVENTOR.
GEORGE J. KEIPER,
BY
ATTORNEY.

May 21, 1929.　　　G. J. KEIPER　　　1,714,311
STEAMER
Filed Oct. 3, 1928　　　3 Sheets-Sheet 2

INVENTOR.
GEORGE J. KEIPER,
BY
ATTORNEY.

May 21, 1929.  G. J. KEIPER  1,714,311
STEAMER
Filed Oct. 3, 1928  3 Sheets-Sheet 3
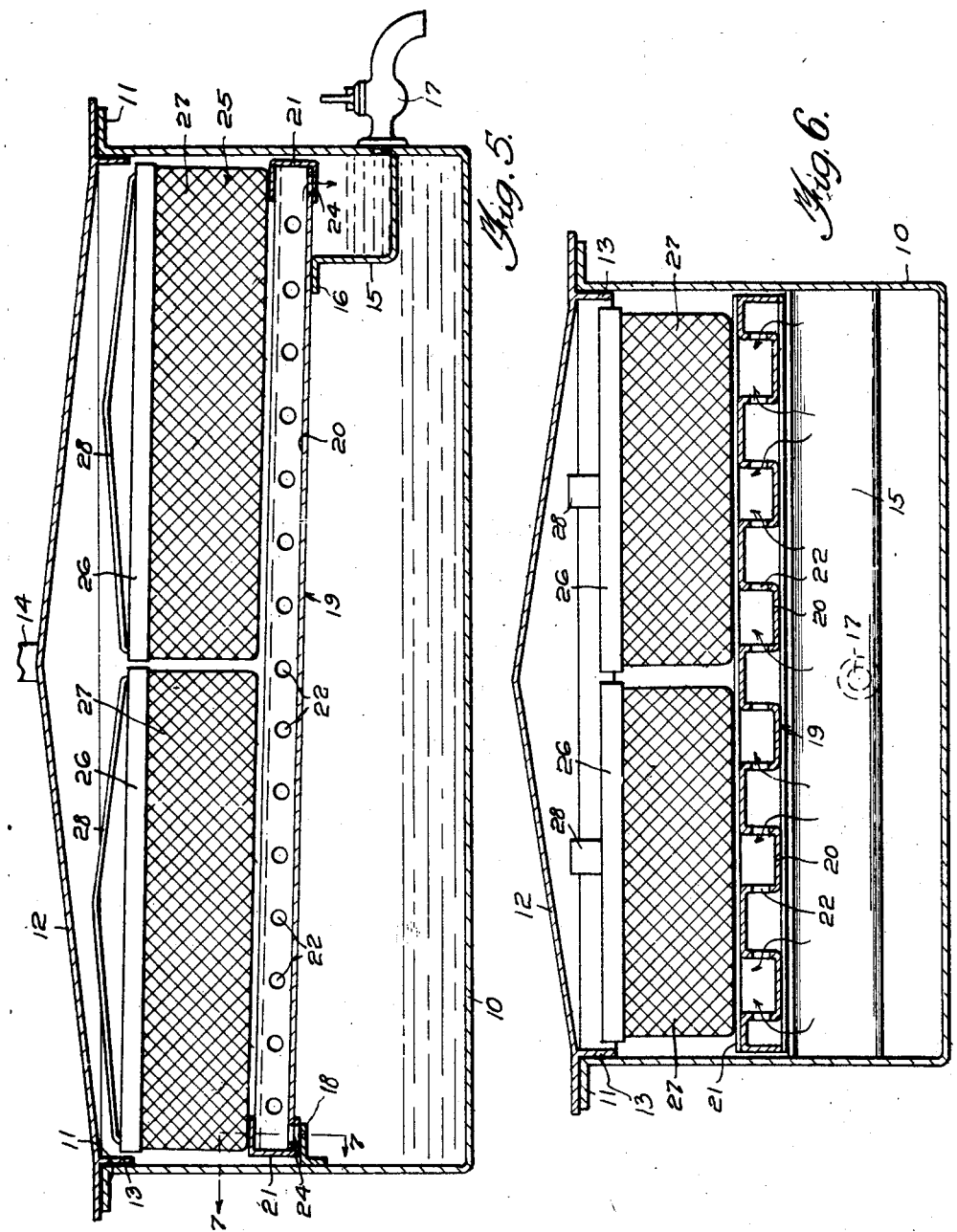
INVENTOR.
GEORGE J. KEIPER,
BY
ATTORNEY.

Patented May 21, 1929.

1,714,311

UNITED STATES PATENT OFFICE.

GEORGE J. KEIPER, OF SCRANTON, PENNSYLVANIA.

STEAMER.

Application filed October 3, 1928. Serial No. 310,007.

My invention relates to improvements in steamers, for cooking clams, fish, meats or other foods.

In accordance with my invention, I provide a casing having a suitable cover. A bouillon trough is arranged within the casing at an elevation from the bottom of the same, and a suitable level of water is held within the bottom of the casing. A tray is mounted within the casing and is preferably slightly inclined, and embodies passages or pockets which discharge the bouillon into the bouillon trough. Basket or baskets of foraminous material are supported upon the tray, and hold the clams or other material to be steamed. The tray is provided with a system of apertures which permit of the free circulation of the steam upwardly through the foraminous baskets, but does not interfere with the discharge of the bouillon to the bouillon trough.

Figure 1:
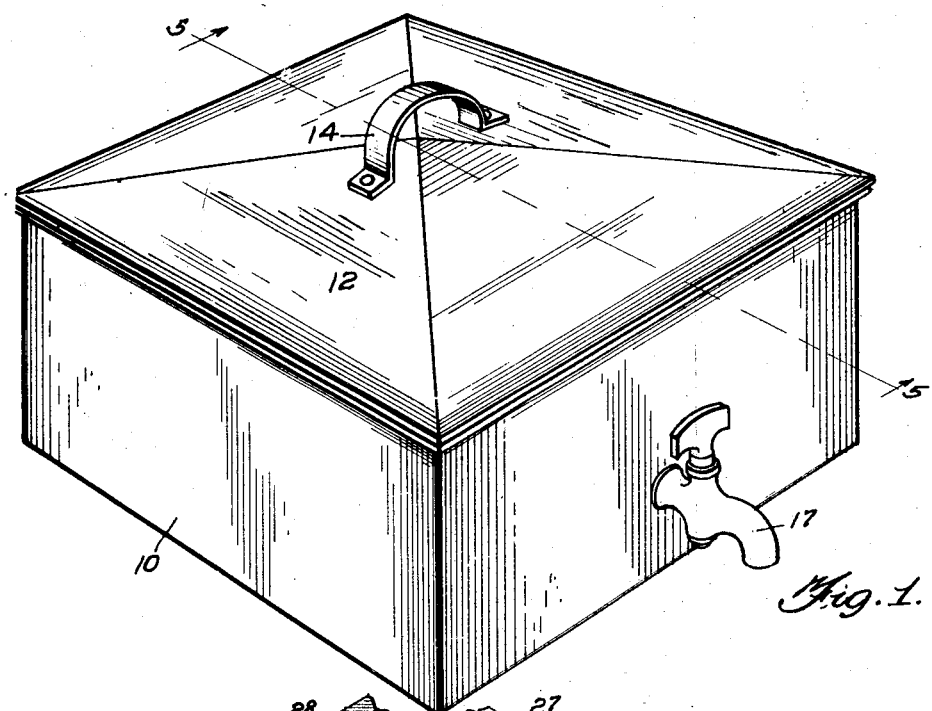
Figure 2:
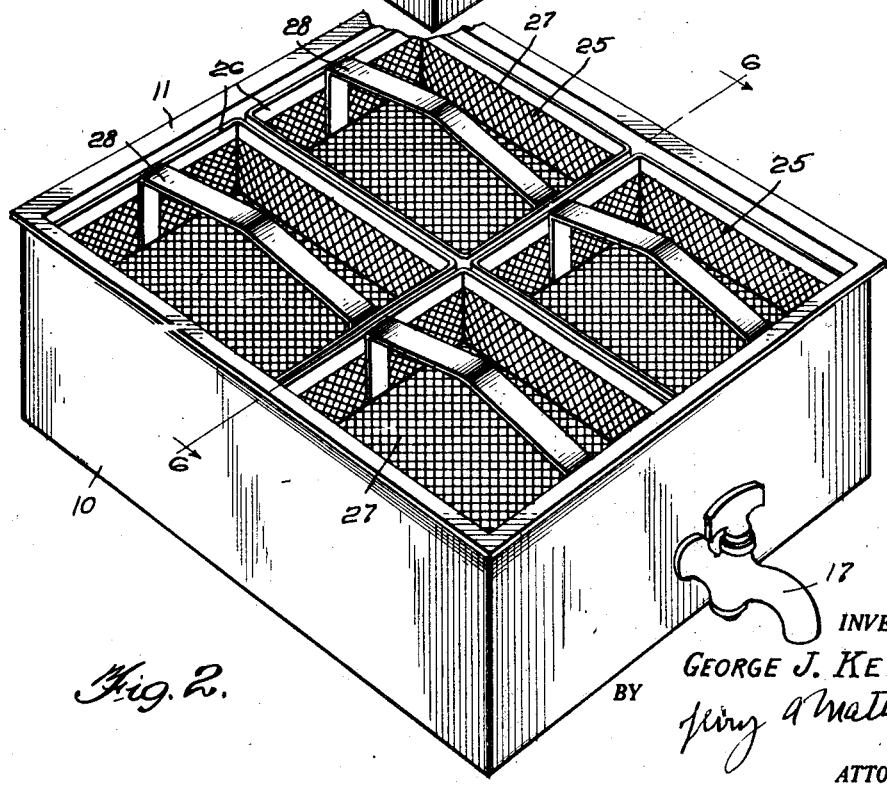
Figure 3:
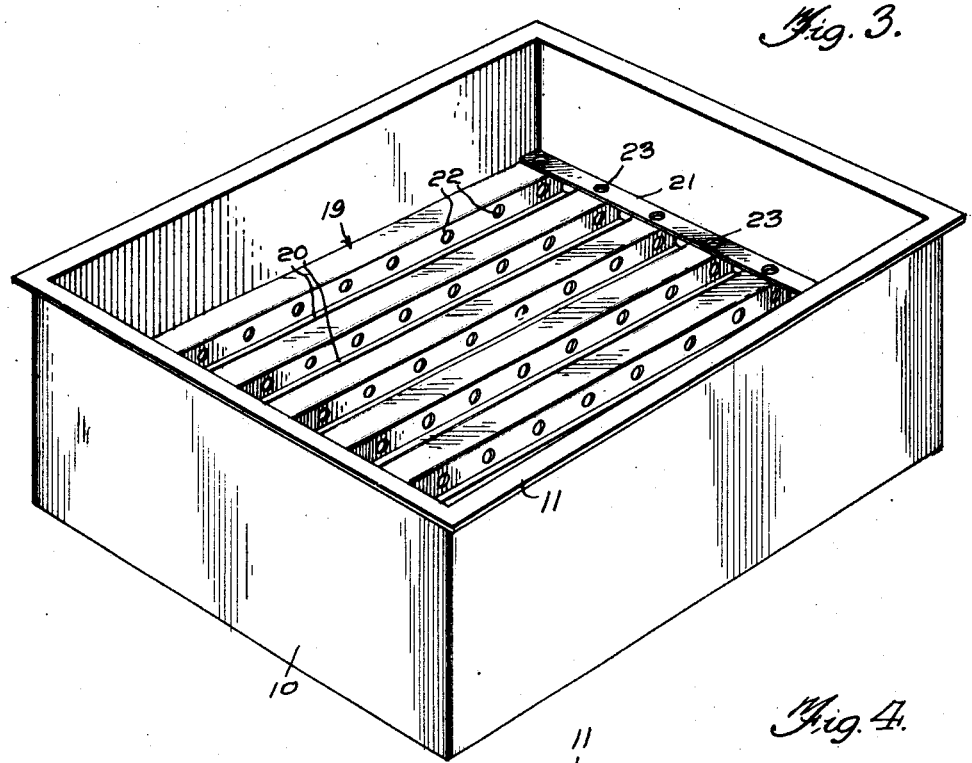
Figure 4:
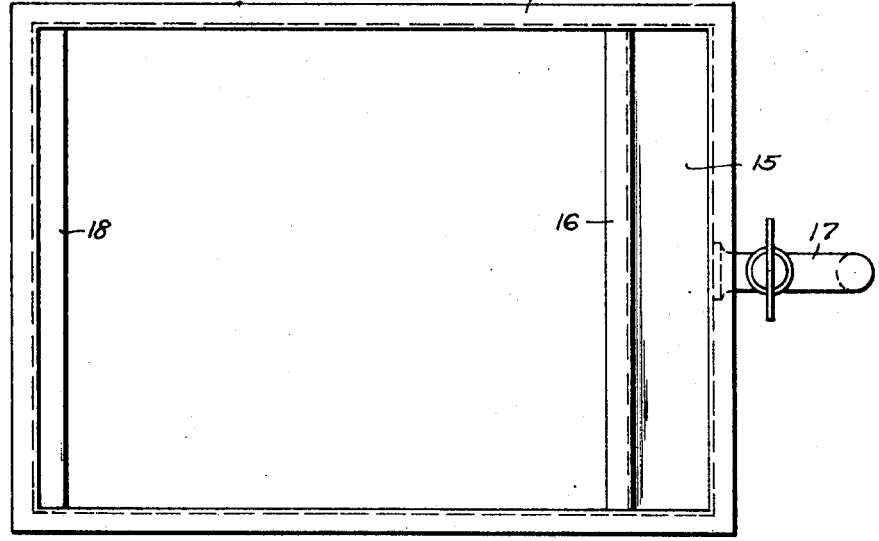
Figure 7:
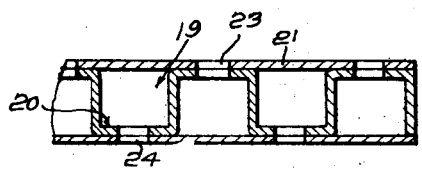

In the accompanying drawings, forming a part of this specification, and in which like numerals are employed to designate like parts throughout the same, Figure 1 is a perspective view of the steamer embodying my invention, Figure 2 is a similar view with the cover removed, Figure 3 is a similar view with the cover and foraminous baskets removed, Figure 4 is a plan view of the casing of the steamer, all parts removed, Figure 5 is a central vertical longitudinal section taken on line 5—5 of Figure 1, Figure 6 is a transverse section taken on line 6—6 of Figure 2, and, Figure 7 is a transverse section through the end of the tray, taken on line 7—7 of Figure 5.

In the drawings, wherein for the purpose of illustration, is shown a preferred embodiment of my invention, the numeral 10 designates a casing, which is preferably rectangular, with its top open, and provided at the top with a horizontal flange 11, projecting outwardly, as shown. This body portion is closed by means of a cover 12, fitting snugly upon the flange 11, and having a depending flange 13, fitting snugly into the upper end of the casing 10, as shown. The cover may be equipped with a handle 14.

Arranged within the casing 10, near and spaced from its bottom, is a trough 15. This trough is disposed at one end of the casing and extends throughout the entire width of the casing, as clearly shown in Figure 4, and is attached to the end and side wall forming a liquid tight joint therewith. The trough is provided with a horizontal flange 16, as shown. Attached to the casing and leading into the bouillon trough 15 is a spigot 17, by means of which the bouillon may be withdrawn from the trough, as desired. Arranged within the casing 10 and attached to the opposite end wall thereof, is a supporting strip or element 18, extending throughout the entire width of the casing 10, as shown. This strip or supporting element is arranged at a slight elevation above the flange 16, as shown.

The numeral 19 designates a bouillon collecting tray, as a whole, formed of a sheet which is bent into depending pockets or passages 20, which are approximately U-shaped in cross section, as clearly shown in Figure 6. The ends of this tray 19 are inserted within end members 21, which are U-shaped in cross section, and are rigidly attached to the tray, as shown. Each U-shaped pocket or passage 20 is provided in its side walls with steam circulating apertures 22, arranged at a substantial elevation above the bottom of the pockets, as shown. Each end member 21 is provided in its top wall with apertures 23, also passing through the tray 19, and in its bottom wall with apertures 24, which all pass through the bottom of the pockets 20. The tray has one end supported by the strip or supporting element 18, which extends across and covers the apertures 24 in the bottom of the adjacent end member 21, and the opposite end of the tray is supported by the flange 16, the tray projecting across the bouillon trough 15, to discharge the bouillon therein, through the apertures 24. The tray is supported at an inclination, to discharge the bouillon into the bouillon trough 15, as shown.

The numeral 25 designates baskets for holding the clams or other material to be steamed. Each basket embodies a frame 26, covered by foraminous material 27, such as wire gauze. Each basket is equipped with a handle 28, so that they may be conveniently removed from the casing and placed therein. While I preferably employ four of these foraminous baskets, the invention is in no sense restricted to this number, as any suitable number may be used.

The operation of the steamer is as follows:
A suitable level of water is maintained within the bottom of the casing 10, and the interior of the bouillon trough 15 has no communication with this water. When the casing is heated, steam generated within the casing 10 passes upwardly through the apertures 22, and the apertures 23 at the elevated end of the tray. The steam properly cooks the clams or the like within the basket, and the bouillon passes downwardly into the pockets 20 of the tray, and gravitates into the bouillon trough 15, from which it may be withdrawn, as desired. Since the apertures 22 are disposed at an elevation above the bottom of the pockets 20, the bouillon will not discharge through these apertures. The apertures 24 at the elevated end of the tray are covered by the supporting element or strip 18, while the apertures 24 at the lower end of the tray, discharge directly into the bouillon trough 15. Since the opposite ends of the tray are identical, either end of the tray may be arranged adjacent to the bouillon trough 15. The tray embodies spaced alternate depressed pockets and raised portions, as shown. The apertures 22 are spaced from the bottom of said pockets, and form the tops of their raised portions. The apertures 23 are formed in the ends of the tops of the raised portions, while apertures 24 are formed in the ends of the bottoms of said pockets. The tray may be inverted, and the raised portions will then become the pockets, and the pockets the raised portions.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:—

1. In a steamer of the character described, a casing, a bouillon trough arranged within the casing near one end thereof, outlet means for the bouillon trough, and a tray arranged within the casing and disposed above said trough, said tray having spaced pockets, said pockets having apertures in their side walls arranged at an elevation above their bottoms, said pockets also having apertures in their bottoms near the ends of the same, the apertures in said bottom being adapted to discharge into said bouillon trough.

2. In a steamer of the character described, a casing, a bouillon trough arranged within the casing near one end thereof, outlet means for the trough, a tray arranged within the casing and having one end extending over said trough, said tray comprising spaced pockets, said pockets having apertures in their side walls disposed at an elevation above the bottoms of said pockets, said bottoms being provided with apertures arranged over said trough.

3. In a steamer of the character described, a casing, a bouillon trough arranged within the casing, outlet means for the trough, a tray arranged within the casing and having one end extending over said trough, said tray comprising spaced pockets, said pockets having apertures in their sides arranged at an elevation above their bottoms and also having apertures near the ends of the bottoms, and foraminous receptacle or receptacles mounted upon said tray.

4. In a steamer of the character described, a casing, a trough arranged within the casing at one end thereof, a supporting element within the casing at its opposite end, a tray arranged upon the trough and supporting element, said tray embodying a sheet bent to provide spaced depressed portions forming pockets and raised portions between the pockets, the sides of the pockets having apertures spaced from the bottom walls of the pockets and the top walls of the raised portions, whereby the tray is reversible in use, foraminous basket or baskets supported upon the tray, and a cover for the casing.

5. In a steamer of the character described, a casing, a trough arranged within the casing, a supporting element within the casing, a tray arranged upon the trough and supporting element, said trough embodying a sheet bent to provide alternate pockets and raised portions, said pockets having apertures in their side walls spaced from the bottoms of said pockets and the tops of said raised portions, said bottoms of said pockets having apertures at their ends, one set of apertures at the ends of said bottoms being covered by the supporting element and the other set of apertures at the opposite ends of said bottoms being adapted to discharge into said trough, said tray being reversible, and a cover for the casing.

6. In a steamer of the character described, as a subcombination, a tray adapted to be inverted when in use, said tray comprising spaced alternate depressed pockets and raised portions therebetween, said pockets being provided in their side walls with apertures spaced from the bottoms of said pockets and from the tops of said raised portions, said bottoms having apertures at their ends, and said tops having apertures at their ends.

In testimony whereof I affix my signature.

GEORGE J. KEIPER.